Oct. 1, 1968  M. SAUTER  3,403,741
BALANCE
Filed June 9, 1967  2 Sheets-Sheet 2
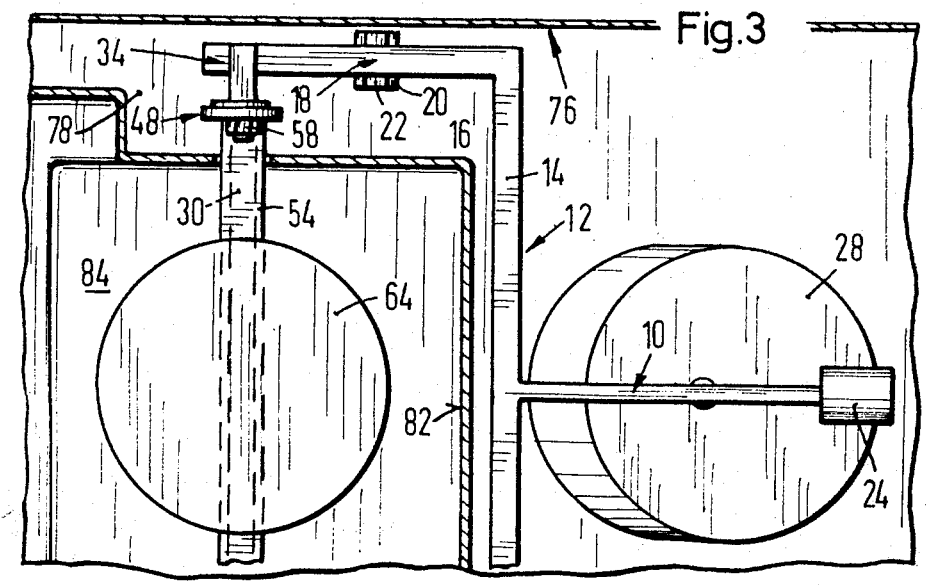
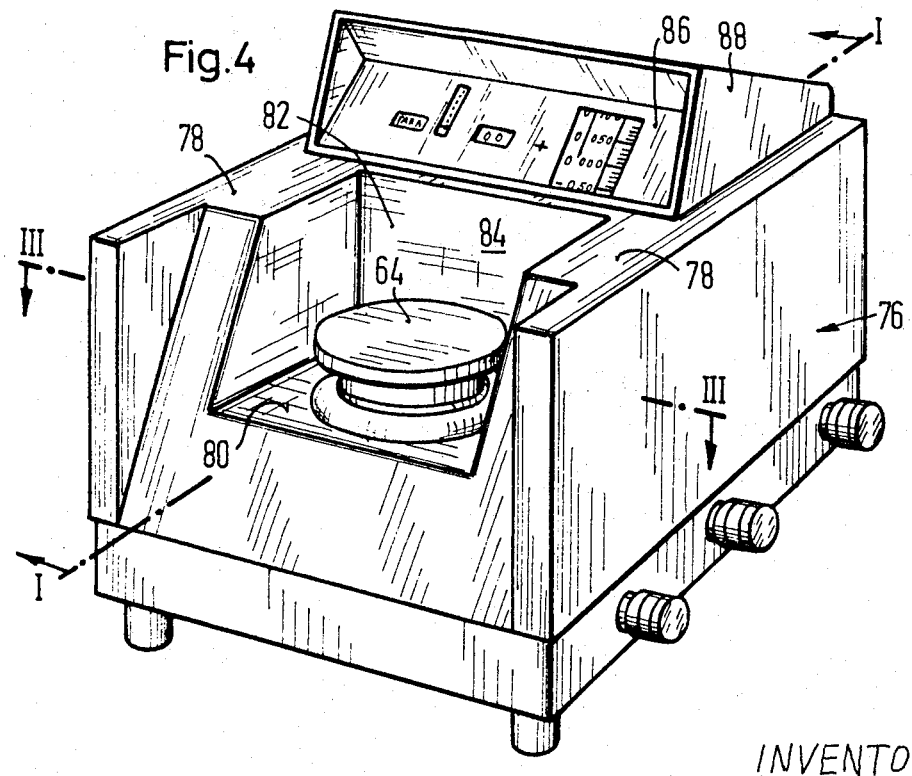
INVENTOR
Martin Sauter
By: Lov and Berman
Agents United States Patent Office
3,403,741
Patented Oct. 1, 1968

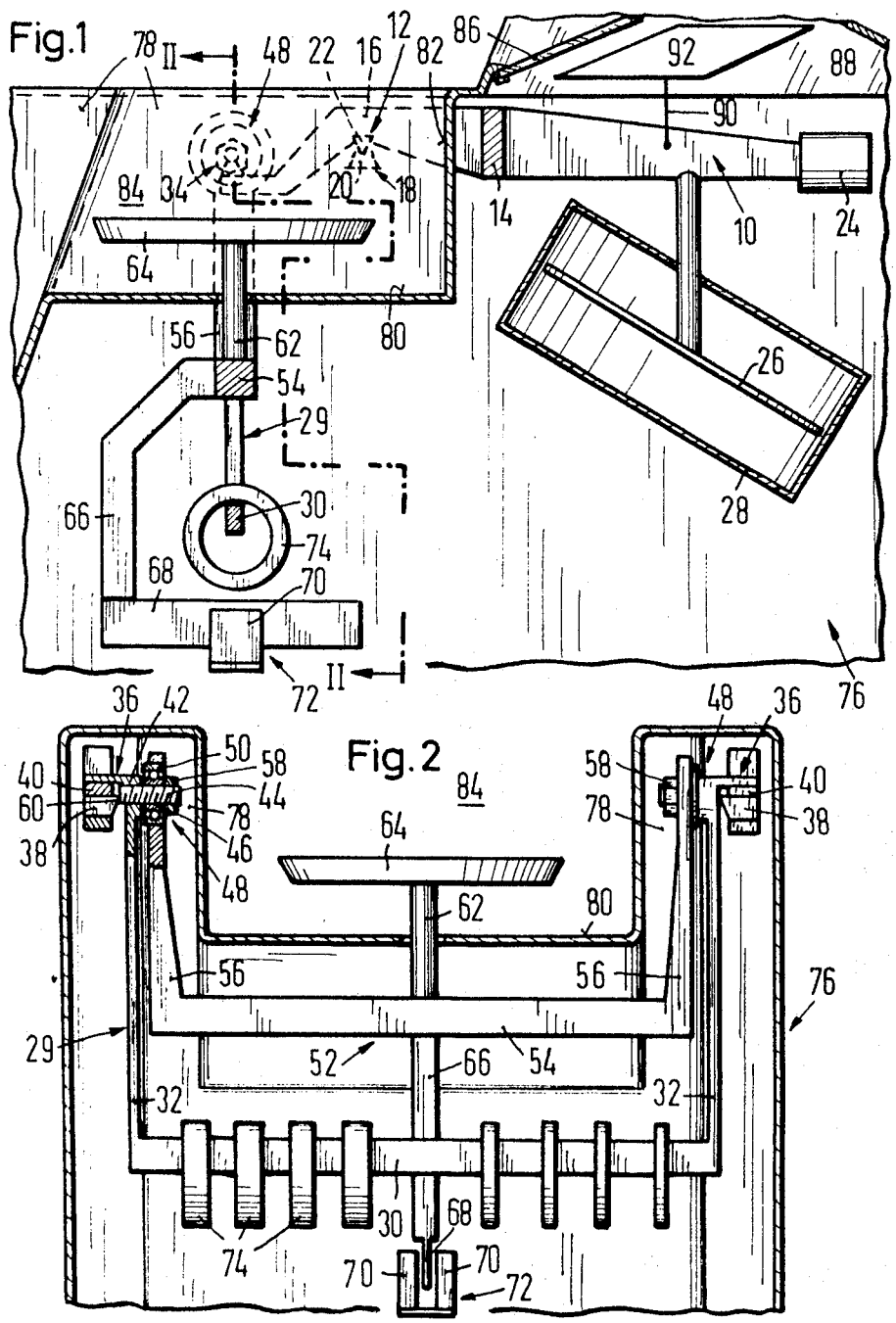

3,403,741
BALANCE
Martin Sauter, Ebingen, Germany, assignor to Gottl.
Kern & Sohn, Ebingen, Germany
Filed June 9, 1967, Ser. No. 644,917
10 Claims. (Cl. 177—243)

ABSTRACT OF THE DISCLOSURE

A balance having a forked beam supported on the balance base by two coaxial knife-edge pivots on the forked end and carrying a U-shaped hanger between a second set of coaxial knife-edge pivots on the two end portions of the forked end. Two ball bearings coaxial with the second set hingedly secure a U-shaped pan carrier to the hanger in the bight of the same. The weighing pan is attached to the central portion of the pan carrier by a fixed upward column in such a manner that the load supporting surface of the pan is barely below the common axis of the ball bearings.

Background of the invention

This invention relates to balances, and particularly to an improvement in precision balances in which a beam having two arms is connected by a first bearing arrangement to a base for swinging movement, and a second bearing arrangement connects a hanger to one of the arms for pivoting movement about an axis spacedly parallel to the axis of the first bearing arrangement. The weighing pan of the balance is mounted on the hanger.

The pan is far below the beam in one type of conventional precision balance and tends to oscillate in a pendulum movement about the second bearing arrangement after being loaded. This movement must be arrested before the load can be weighed, and some time is lost thereby. The hanger, which extends upwardly from the loading surface of the pan, interferes with access to the pan, and the pan is normally enclosed in a casing which prevents ambient air currents from interfering with the weighing operation, but further limits access to the pan.

The balance of the aforedescribed known type is not affected by off-center loading of its pan, and it requires but two sets of pivots, thus being inherently capable of high precision.

In another type of known balances, the weighing pan is arranged above the beam, and is held in a horizontal position by a parallelogram linkage which prevents oscillation of the pan on the beam. The pan can be made readily accessible at all times, but its precision is reduced by at least two supplemental pivots, and it is quite sensitive to off-center loading.

The object of the invention is the provision of a beam balance which combines the advantages of the aforedescribed two types while avoiding their shortcomings.

Summary of the invention

In the improved balance of the invention, the beam is forked in such a manner that it has two longitudinally coextensive end portions. The hanger arrangement includes a substantially U-shaped hanger. The bearing arrangement which connects the hanger to the beam includes two coaxial pivots spaced in the direction of the common axis. The pivots respectively connect the terminal parts of the hanger to the end portions of the beam. The weighing pan is mounted on the hanger in such a manner that it is axially spaced from the terminal hanger parts in opposite respective directions and upwardly spaced from the central part of the hanger.

The top face of the pan which defines the load supporting surface of the same is preferably downwardly offset from the common axis of the pivots by a small distance, not greater than one-half the axial spacing of the pivots.

Other features, additional objects, and many of the attendant advantages of this invention will be readily appreciated as the same becomes better understood by reference to the following detailed description of a preferred embodiment when considered in connection with the accompanying drawing.

Brief description of the drawing

In the drawing:

FIG. 1 shows a balance of the invention in side-elevational section;

FIG. 2 illustrates the balance of FIG. 1 in rear-elevational section on the line II—II;

FIG. 3 shows the balance in fragmentary plan view, portions of the housing being broken away to reveal internal structure; and FIG. 4 is a perspective view of the same balance.

Description of the preferred embodiment

The beam 10 of the illustrated balance has a forked end 12 constituted by a transverse member 14 and two parallel longitudinally coextensive branches 16. The main bearings 18 of the balance are constituted by a pair of bearing plates 20 and a pair of knife edges 22, the bearing plates being elements of the stationary balance base, not otherwise shown, and conventional in itself, and the knife edges 22 being respectively mounted in coaxial alignment on the branches 16.

The unitary end of the balance beam 10 carries a counterweight 24 and a damping vane 26 which moves inward and outward of a damping chamber 28 with little clearance to produce a dash-pot effect during swinging movement of the beam 10. The chamber 28 is fixedly mounted on the balance base in a conventional manner, not shown.

The free ends of the branches 16, which are downwardly offset from the knife edges 22 are pivotally connected to a U-shaped hanger 29 of the balance by a bearing arrangement 34. The bearing arrangement consists of two pivots 36 having a common axis and spaced along that axis. Each pivot consists of a knife edge 38 on a branch 16 and a bearing plate 40 of V-shaped cross section on a corresponding terminal part 32 of the hanger 29. The two hanger parts 32 depend from the associated pivots 36 and their bottom ends are linked by a horizontal, central hanger part 30.

The top ends of the hanger parts 32 carry ball bearings 48 coaxial with the pivots 36. A U-shaped pan carrier 52 is hingedly suspended from the ball bearings within the bight of the hanger 29. The vertical legs 56 of the pan carrier 52 are provided at their top ends with openings in which the outer race rings 50 of the ball bearings are fixedly fastened. The inner race rings 46 are mounted on coaxial pins 44 threadedly received in corresponding bores 42 of the hanger parts 32 and secured in a desired axial position by locking nuts 58.

As is best seen in FIG. 2, the upwardly directed knife edges 38 on the beam 10 are axially pointed, the point 60 being directed toward a transverse end face of an associated pin 44. The pins may thus be threadedly moved toward and away from axially abutting engagement with the points 60, and are normally adjusted to provide only minimal clearance to the points, thereby precisely locating the hanger 29 and the bearing plate 40 in an axial direction.

The transverse portion 54 of the pan carrier 52 which connects the legs 56 is provided with a fixedly mounted upward column 62 for the weighing pan 64. A C-shaped weight depends from the pan carrier portion 54 and partly spacedly envelopes the central hanger part 30. An aluminum plate 68 attached to the lower end of the weight 66 moves between the pole pieces 70 of a permanent magnet 72 when the pan carrier 52 oscillates in the ball bearings 48 so that the oscillating movement is braked by the eddy currents generated in the aluminum plate.

The illustrated balance of the invention is of the known single-pan, weight-substitution type. The weight of an object placed on the pan 64 is determined by lifting annular weights 74 from the horizontal central part 30 of the hanger 29 on which they are normally strung. The mechanism which lifts the individual weights and indicates their combined value has not been shown, since it may be entirely conventional.

As is most readily evident from FIG. 4, the housing 76 of the balance has the approximate shape of an arm chair. Only the pan 64 and top end of the column 62 extend outside the housing, but are protected from air currents in a recess 84 of the housing which is open in a forward and upward direction for easy access to the pan, and is otherwise bounded by a bottom wall 80, two opposite side walls 78, and a back wall 82. The walls are hollow and enclose the beam 10, the hanger 29, the associated bearing arrangements and all other working elements of the balance. The knobs by means of which the balance is operated in a conventional manner are mounted on the outside of the housing 76, and windows in the housing display indicia which indicate the state of balance equilibrium, the weight of an object loaded on the pan 64, and the like in a manner well known in itself and not directly relevant to this invention.

The illustrated balance combines the high precision of a conventional balance in which the weight of the load is applied to only two pivots or sets of pivots with the easy accessibility of the pan that was available heretofore only at some sacrifice of precision. The weighings are not affected by off-center loading of the pan. The pan is prevented from oscillating for any length of time by the magnetic damper 68, 70, 72, but the oscillations, such as may occur, have only a minor effet on the readings obtained because the load carrying surface of the pan is very close to the axis of oscillation.

Yet, being arranged below that axis, the pan is stable, and its stability is further enhanced by the C-shaped weight 66. It will be appreciated that the pan may be raised above the common axis of the pivots 36 and of the ball bearings 48 if the weight 66 is heavy enough, but the useful life of all knife edges in the balance is unfavorably affected by any increase in the radial forces acting on the edges, and the illustrated position of the pan provides a suitable compromise between full accessibility of the pan and long life of the knife edges.

The precision of the balance is significantly improved by mounting the pan on a separately pivoted pan carrier, and not on the hanger 29 directly. The friction in the ball bearings has no measurable effect on the sensitivity of the balance, but the ball bearings connect the pan carrier 52 to the hanger 29 in such a manner that the carrier contributes materially to the rigidity of the assembly, thus permitting the hanger as well as the carrier to be reduced in bulk and weight as compared to the use of a different pivotal linkage.

The axial spacing of the main bearings 18 is substantially equal to that of the pivots 36, and thus greater than the greatest corresponding dimension of the pan 64. The center of gravity of an object placed off-center on the pan 64 is still between the bearings 18, and the off-center placement cannot affect the weighing.

The pan 64 is normally located just under the top edges of the housing walls 78, 82. In actual use of the illustrated balance, it has been found particularly convenient that the hand of an operator may be supported on one of these top edges while material is being placed on or withdrawn from the pan 64. As is best seen in FIGS. 1 and 2, the exposed annular edge face of the pan 64 extends downward from the load supporting surface of the pan and tapers conically in a downward direction. It does not interfere with horizontal movement of objects to be weighed toward and away from the loading surface.

It should be understod, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a precision balance having a base; an elongated balance beam having two arms; first bearing means connecting said beam to said base for swinging movement about said axis; hanger means; second bearing means connecting said hanger means to said arm of said beam for pivotal movement about an axis spacedly parallel to said axis of swinging movement; and a weighing pan mounted on said hanger means, the improvement comprising:
    (a) said beam being forked so as to have two longitudinally coextensive branch portions;
    (b) said hanger means including a substantially U-shaped hanger member having a central part and two terminal parts;
    (c) said second bearing means including two coaxial pivots spaced in the direction of the common axis thereof and respectively connecting said terminal parts to said branch portions; and
    (d) said weighing pan being axially spaced from said terminal parts in opposite respective directions and upwardly spaced from said central part.

2. In a balance as set forth in claim 1, said pan having a top face defining a load supporting surface, said surface being downwardly offset from said common axis a distance not greater than one-half the axial spacing of said pivots.

3. In a balance as set forth in claim 2, a pan carrier having two terminal portions and a portion intermediate said terminal portions, and third bearing means hingedly connecting said terminal portions to said terminal parts respectively for movement about said common axis, said pan being mounted on said intermediate portion.

4. In a balance as set forth in claim 3, said pan carrier being elongated and substantially U-shaped and being arranged between said parts of the hanger member.

5. In a balance as set forth in claim 3, said pivots being each constituted by a bearing plate member and a knife edge member, the members of each pivot being respectively fixedly fastened to the associated terminal part and the associated branch portion, and said third bearing means including two anti-friction bearings, each anti-friction bearing having two race portions and a plurality of bearing members interposed between said race portions in rolling contact therewith, said race portion being respectively fixedly fastened to a corresponding terminal part and a corresponding terminal portion.

6. In a balance as set forth in claim 5, a locating member mounted on each of said terminal parts for threaded movement toward and away from a position of axial abutment against the member of the associated pivot fixedly fastened to the associated end portion, one of said race portions being mounted on said locating member.

7. In a balance as set forth in claim 3, said pan carrier being elongated, said terminal portions thereof being longitudinally spaced, a C-shaped weight depending from said intermediate portion and partly spacedly enveloping said central part of the hanger member, and a magnetic damper having a magnet part and a damper plate part, the parts of said damper being respectively mounted on said C-shaped weight and on said base.

8. In a balance as set forth in claim 1, a plurality of weights releasably supported on said central part.

9. In a balance as set forth in claim 1, said first bearing means including two axially spaced coaxial pivots respectively interposed between said branch portions and said base, the axial spacing of the pivots of said first bearing means being substantially equal to the axial spacing of the pivots of said second bearing means.

10. In a balance as set forth in claim 1, a housing formed with an upwardly and forwardly open recess, said housing including a bottom wall in said recess, two opposite side walls and a rear wall upwardly extending from said bottom wall, said walls being hollow and enclosing said beam, said hanger means, and said first and second bearing means, said weighing pan being located in said recess, and pan carrier means extending downward from said pan through an opening in said bottom wall for connecting the pan to said hanger means.

References Cited
UNITED STATES PATENTS

| | | | |
|---|---|---|---|
| 292,395 | 2/1884 | Meyer | 177—262 X |
| 942,945 | 12/1909 | Stauffer | 177—243 X |
| 3,189,111 | 6/1965 | Ast | 177—246 X |

RICHARD B. WILKINSON, *Primary Examiner.*

G. H. MILLER, Jr., *Assistant Examiner.*